April 21, 1964     L. M. FIELD ETAL     3,130,364
TRAVELLING WAVE TUBE SPECTRUM ANALYZER
Filed June 25, 1952                     2 Sheets-Sheet 1

INVENTORS
LESTER M. FIELD
JOHN A. MITCHELL
BY Paul B. Hunter
ATTORNEY

April 21, 1964  L. M. FIELD ETAL  3,130,364
TRAVELLING WAVE TUBE SPECTRUM ANALYZER
Filed June 25, 1952  2 Sheets-Sheet 2

INVENTORS
LESTER M. FIELD
JOHN A. MITCHELL
BY Paul B. Hunter
ATTORNEY

United States Patent Office 3,130,364
Patented Apr. 21, 1964

3,130,364
TRAVELLING WAVE TUBE SPECTRUM
ANALYZER
Lester M. Field, Palo Alto, and John A. Mitchell, Glendale, Calif., assignors to The Board of Trustees of the Leland Stanford Junior University, Stanford University, Calif., a legal entity of California having corporate powers
Filed June 25, 1952, Ser. No. 295,583
5 Claims. (Cl. 324—77)

This invention relates to improvements in radio spectrum analyzers or panoramic receivers for detecting the presence of radio signals within a given band of frequencies, and indicating the frequencies and approximate amplitudes of such signals. The present invention is directed principally to spectrum analyzers for microwave frequencies, up to several thousand megacycles per second.

Prior art radio spectrum analyzer systems have involved the use of a calibrated receiver which could be tuned slowly over its band, producing output briefly as it is tuned past the frequency of each signal in the band. Such receivers can be made to scan continuously, with the output displayed on a cathode ray oscilloscope swept in synchronism with the frequency variation to give a graphic indication of signal frequencies and relative amplitude.

The resolution of scanning analyzers, i.e. the minimum amount by which two signals must differ in frequency in order to be distinguishable, is proportional to the square root of the scanning rate in cycles per second. Thus if a wide band is to be covered at frequent intervals, resolution must be sacrificed. This limitation becomes a serious problem when it is desired to operate with pulsed signals of brief duration, such as radar signals. For example, a scanning analyzer designed to detect all radar pulses received within a given frequency range would require a sweep period of about one tenth microsecond. If the range to be covered were 1000 megacycles wide the resolution bandwidth would be about 130 megacycles, which is so much that signals from different transmitters might easily be confused.

One of the principal objects of the present invention is to provide microwave radio spectrum analyzers which do not scan at all, but respond substantially instantaneously to any received signals whose frequencies are within the acceptance band, regardless of when they occur or what their frequencies are.

Another object is to provide non-scanning spectrum analyzers which will accept and respond to signals of any frequency throughout an extremely wide band.

A further object of this invention is to provide radio spectrum analyzers whose resolution is not fundamentally limited by the width of the band to be covered or the nature of the signals to be detected.

Another object is to provide spectrum analyzers which will respond simultaneously to each of a plurality of simultaneous signals substantially without regard to the presence of the others.

The subject matter of the present application is disclosed but not claimed in copending U.S. patent application Serial No. 262,311, filed December 18, 1951, by Lester M. Field.

According to this invention, a beam of electrons is directed along a wave propagating structure which has the property of carrying high frequency electromagnetic waves so as to produce space harmonic field components with phase velocities that depend upon the frequency. Electrons travelling synchronously with a transverse field component are deflected transversely of the beam, and their deflections may be indicated as in a cathode ray oscilloscope by means of a fluorescent screen. The beam is made ribbon-shaped with substantial width laterally of the direction of electron flow. The propagating structure is of similar width, and designed so that the relationship between frequency and phase velocity varies along its width. With this arrangement, using a beam wherein all of the electrons have substantially the same longitudinal velocity, the fields produced by input waves of any particular frequency (within the acceptance band of the device) will travel synchronously with the electrons only along a respective longitudinal element of the beam and at different velocities along all the other elements. The electrons in a part of the beam whose lateral position corresponds to the input frequency will be deflected out of the plane of the beam, while those in other parts of the beam will be subject to alternately opposite small deflections which tend to cancel, producing no net deflection.

The invention will be described with reference to the accompanying drawings, wherein FIG. 1 is a perspective view of a device embodying the invention, with its outer structure partly broken away to show certain interior details.

Figure 1:
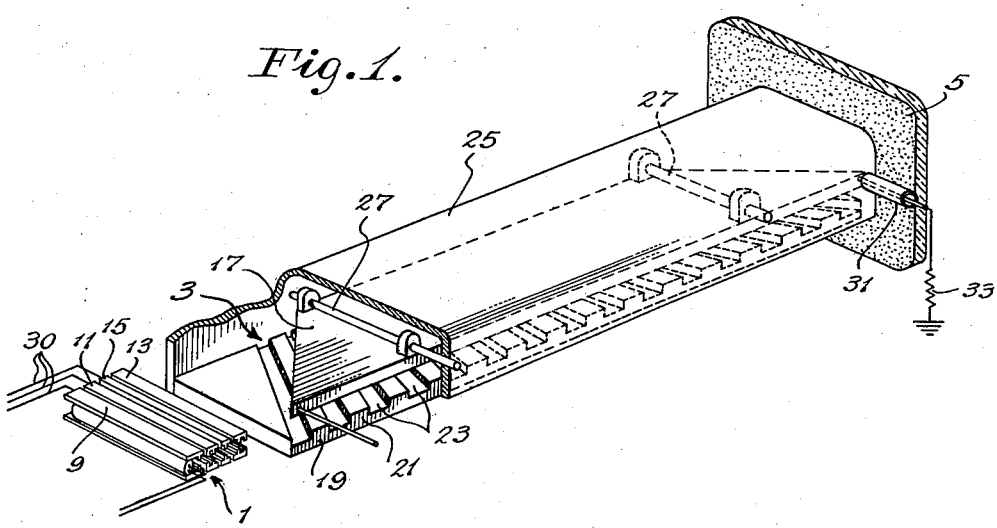

Referring first to FIG. 1, the illustrated structure includes an electron gun 1, a wave propagating structure 3 which consists of a length of a special type of transmission line, and a target or screen 5 coated with a fluorescent material such as one of the phosphors of the type used in cathode ray oscilloscope tubes.

Figure 2:
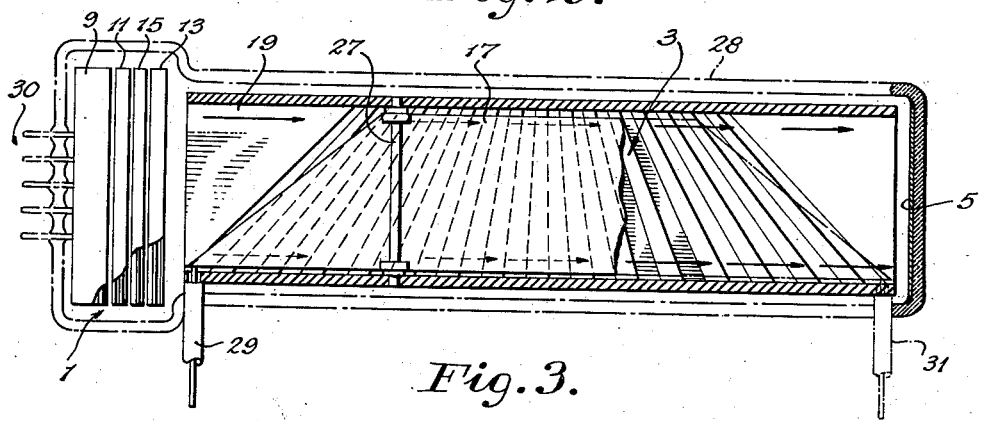
FIG. 2 is a plan view, partly in section, of the device of FIG. 1.
Figure 3:
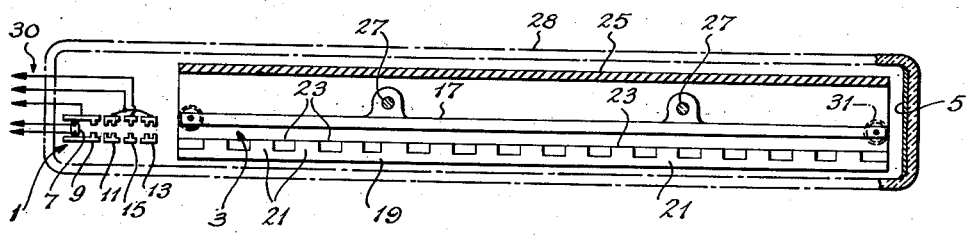
FIG. 3 is a side elevation in section of the device of FIG. 1.
Figure 4:
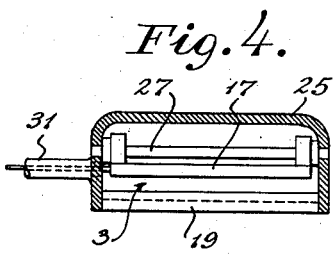
FIG. 4 is a transverse section of the device.

The electron gun 1 is designed to produce a flat relatively wide ribbon shaped beam, and for this purpose it may be constructed like a figure of translation of the structure commonly used in cathode ray oscilloscopes for producing ray-like linear beams. As shown in FIG. 3, the gun 1 may include a cathode 7, a grid or intensity control electrode 9, anode electrodes 11 and 13, and a focussing electrode 15, all of said elements being elongated, as shown in FIG. 2, to substantially the width of the propagating structure 3.

The propagating structure 3 is essentially a parallel plate transmission line, comprising an upper flat conductor 17 and a lower conductor 19, both extending through most of the space between the gun 1 and the target 5. The gun directs the electron beam between the plates 17 and 19. The lower plate or conductor 19 is provided with a series of transverse slots 21 separated by teeth 23, so that it looks something like a gear rack. However, as shown in FIG. 2, the spacing and width of the slots 21 and teeth 23 decreases uniformly from one side of the plate (the lower side in FIG. 2) to the other side. The upper plate 17 may be similarly corrugated, or may be smooth, as shown. A conductive shield 25 of inverted U-shaped cross section extends over the plate 17 and is connected to and closed at the bottom by the plate 19. The plate 17 is supported within the enclosure thus formed, by rods 27 of dielectric material such as quartz. The upper plate 17 may be trapezoidal as shown, tapered at its ends to provide a smooth transition to approximately the impedance of a standard coaxial transmission line.

All of the foregoing elements are enclosed in a vacuum envelope 28, which may be made of glass. Leads 30 for connection of the electron gun elements to an appropriate power supply source, such as a battery, extend through seals in the envelope 28.

An input coaxial line 29 has its inner conductor connected to the end of the wide edge of the plate 17, and its outer conductor to the shield 25. A similar arrangement 31 may be provided at the other end to terminate the line, for example by connection to an external resistor 33.

Figure 5:
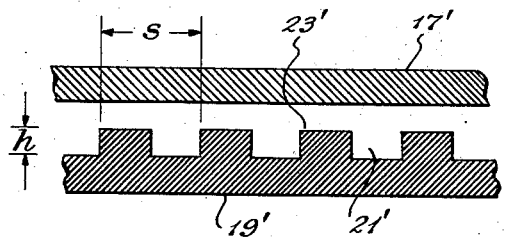
FIG. 5 is a longitudinal section of a wave propagating structure of the periodic type like that used in the device of FIGS. 1 through 4.

To explain the operation of the device, some discussion of the characteristics of periodically loaded transmission lines is necessary. FIG. 5 shows a section 17', 19' of a parallel plate line similar to the structure 17, 19 of FIG. 1, but for the present only a thin longitudinal portion is considered, so that the effect of tapering the slots laterally of the line is not involved.

Figure 6:
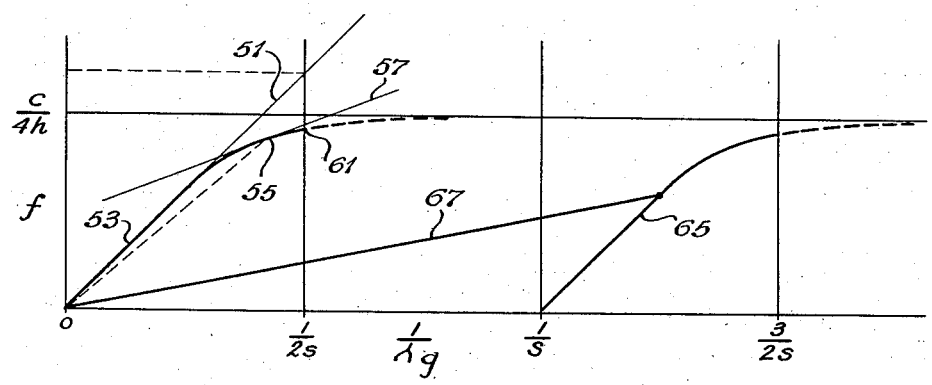
FIG. 6 is a graph showing the propagation characteristics of the structure of FIG. 5.

FIG. 6 is a graph of frequency as a function of the reciprocal
$$\frac{1}{\lambda_g}$$
of wavelength $\lambda_g$ on a propagating structure. In a simple parallel plate transmission line without any loading, the wavelength $\lambda$ and frequency $f$ are related in the same manner as in the propagation of waves in free space:
$$f = \frac{c}{\lambda}$$
where $c$ is the velocity of light. This is represented in FIG. 6 by the straight line 51, which has the slope $c$ at every point.

Now consider a line like that formed by the plates 17' and 19'. Let $s$ be the distance between corresponding points on adjacent teeth 23' (i.e. $s$ is the period of the loading) and let $h$ be the depth of the slots 21', or the height of the teeth 23'. The characteristic of such a line is shown by the curve 53 in FIG. 6; at low frequencies, the reciprocal guide wavelength and the frequency are linearly proportional, and the propagation velocity, as shown by the slope of the line, is $c$, the same as that of an unloaded line.

As the frequency is increased, approaching the quarter-wave resonance of the slots 21', i.e. the frequency at which the free space wavelength is four times the slot depth $h$, the slots introduce more inductive reactance in series along the line, and more energy is stored per unit volume for a given amount of power transmitted. The group velocity $v_g$ is the velocity with which energy travels along the line. The transmitted power is the product of the group velocity and the energy density. Therefore, as the stored energy per unit power per unit volume increases, the group velocity decreases.

In FIG. 6, the group velocity at any particular frequency is shown by the slope of the curve 53 at the respective point; for example at the point 55, the group velocity $v_g$ is the slope of the tangent line 57. As the quarter wave resonant frequency
$$\frac{c}{4h}$$
is approached, the group velocity approaches zero and the curve 53 departs from the line 51, becoming asymptotic to the horizontal at
$$\frac{c}{4h}$$

The reciprocal guide wavelength increases rapidly, approaching infinity ($\lambda_g = 0$) at resonance. However, transmission along the line ceases abruptly at some lower frequency, when the guide wavelength becomes equal to $2s$. At this point, the slot spacing $s$ is one half wavelength, and destructive interference takes place between the reflections from successive slots. This is indicated in FIG. 6 where the line 53 is broken where the guide wavelength is more than $2s$, beyond the point 61.

Space harmonics result from the fact that in a periodic structure like the parallel plate line of FIG. 5, the electric fields are more concentrated in the regions between the plate 17' and the ends of the teeth 23' than in the regions between the plate 17' and the slots 21'. Suppose a wave to be travelling along the line with a relatively high phase velocity, so that any particular phase front passes over many of the teeth, for example 20 of them, during one radio frequency cycle. Then the guide wavelength $\lambda_g$ is $20s$, and the phase velocity $v_p$ is $20sf$. An electron moving synchronously with this phase front would remain in a unidirectional field during its entire passage along the line.

Now consider an electron moving much more slowly, so that it travels only a distance $s$ during the time (slightly more than one R.F. cycle) that the phase front travels $21s$. Let this electron be in one of the high field intensity regions adjacent one of the teeth 23' when the phase front is passing it, for example at an instant when the electric field is at a maximum from the plate 17' to this particular tooth 23'. One half cycle later the electron is overtaken and passed by an oppositely directed phase front, with the electric field going from the bottom plate 19' toward the top plate 17'. But now the electron is in one of the low field intensity regions adjacent a slot 21'. The first downwardly directed phase front is followed at a distance $20s$ by a second, similar one, which overtakes the electron just as it passes through the next high intensity regions adjacent the next tooth 23'.

Thus, as the electron travels along the line, it encounters a field which alternates between a high intensity maximum in one direction (downward, in this example) and a low intensity maximum in the other direction. This is equivalent to a net unidirectional field, with an alternating field superimposed on it. The unidirectional component is, as far as the electron is concerned, exactly like the one in which it would be if it were moving at the phase velocity of the wave, $20sf$. In effect, there is a wave travelling synchronously with the electron, at a phase velocity $v'_p$ which is
$$\frac{1}{21}$$
the phase velocity $v_p$ of the fundamental. This relatively much slower wave is the first space harmonic. By similar reasoning, the existence of a series of further higher order space harmonics can be deduced.

From the foregoing, it can be seen that the guide wavelength of the first space harmonic is
$$\lambda'_g = \lambda_g \frac{s}{\lambda_g + s}$$
where $\lambda_g$ is the guide wavelength of the fundamental. The reciprocal guide wavelength is therefore
$$\frac{1}{\lambda'_g} = \frac{\lambda_g + s}{s\lambda_g} = \frac{1}{\lambda_g} + \frac{1}{s}$$
Thus the reciprocal guide wavelength of the first space harmonic at any frequency is
$$\frac{1}{s}$$

more than that of the fundamental at that frequency. This is represented in FIG. 6 by the line 65, which is exactly like the line 53, but displaced from it along the abscissa by the amount $$\frac{1}{s}$$

The phase velocity $v'_p$ of the space harmonic wave at any frequency is indicated in FIG. 6 by the slope of a line, such as the line 67, drawn from the origin to the point on the curve 65 which corresponds to that frequency. It is apparent that $v'_p$ increases with frequency throughout most of the band from zero frequency up to $$\frac{c}{4h}$$

where slot resonance occurs. The maximum value of $v'_p$ is about equal to $$\frac{c}{4h}$$

divided by $$\frac{3}{2s}$$

or $$\frac{cs}{6h}$$

Suppose a thin beam of electrons to be flowing longitudinally along the line of FIG. 5, in the space between the conductors 17' and 19' at a uniform velocity, $u$. Let high frequency electromagnetic wave energy be applied to the line, so as to flow along it in the same direction as the beam. The phase velocity $v'_p$ of the first space harmonic component will vary with the frequency $f$ in a manner determined by the slot spacing $s$ and the depth $h$, as described above. At some frequency $f_0$, $v'_p$ will be equal to $u$. Under this condition, each electron will be subject to a unidirectional electric field component throughout its travel along the line, because it is travelling in synchronism with such a component. Some of the electrons will be deflected upward in FIG. 5, some will be deflected downward, and some will not be deflected at all, depending upon their respective positional relationships with the travelling field. Thus, when the frequency is $f_0$, the beam will be spread out vertically by an amount which depends upon the amplitude of the high frequency input. At input frequencies other than $f_0$, the electrons are subject only to alternating fields which do not produce a cumulative effect, an electron may follow a more or less sinuous path, but its net deflection is substantially zero.

Figure 7:
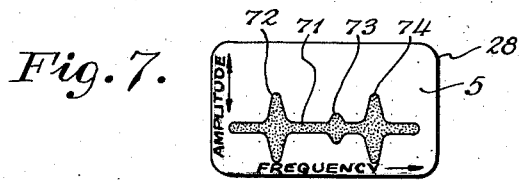
FIG. 7 is an illustration of a typical indication produced by the device of FIGS. 1 through 4.

In the structure of FIGS. 1 through 4, each longitudinal element acts like the thin section of FIG. 5, but each one has a different slot spacing $s$, and therefore a different resonance or interaction frequency $f_0$, at which the phase velocity $v'_p$ is equal to the electron velocity $u$. Therefore, with any given input frequency, the ribbon shaped beam will spread out vertically only in the element where the slot spacing is such as to cause synchronism between the electrons and the space harmonic field. Referring to FIG. 7, the beam striking the fluorescent screen 5 will produce a luminous trace 71. In the absence of input signals, the trace 71 is simply a horizontal line. An input signal within the acceptance band of the device widens the trace as shown at 72, at a lateral position which corresponds to the frequency, and to an extent which corresponds to the amplitude. Other signals, of different frequencies, produce other similar marks such as 73 and 74 at points corresponding to their respective frequencies. Since interaction occurs in a different longitudinal element of the beam for each different frequency, input signals of different frequencies which are present simultaneously cause simultaneous indications, each independently of the presence or absence of the other.

Since the space harmonic phenomenon does not depend upon slot resonance effects, the slot depth $h$ is not critical, as long as it is enough to provide the required alternate strong field and weak field regions. The slot spacing, and its variation across the line, is determined by the frequency range to be covered, and the electron velocity $u$ to be used. It is evident that almost any desired conditions can be met, up to the point where the required slot dimensions become so small as to make fabrication difficult.

In a spectrum analyzer which has been built and operated, the conductor 19 is 63.2 centimeters long, 4 cm. wide, and provided with 181 slots. The slots are 2 to 3 mm. deep, and their spacing $s$ varies from 2.32 mm. on one side of the conductor 19 to 3.48 mm. on the other side. The beam voltage (i.e. acceleration potential) used with this device is about 500 volts. The acceptance band extends from 4000 to 6000 megacycles per second, and the resolution is about 41 megacycles at 5000 megacycles. The sensitivity is about 3 milliwatts for 1 mm. deflection of the beam. The above design is given by way of example only and it will be apparent that the proportions may be varied according to the performance desired. The interaction between the line structure and the electron beam may provide appreciable amplification of the input signals, in the same manner as in the operation of a travelling wave tube of the so-called transverse field type. The described device may be embodied in a radio receiver system in which it is preceded by a wide band amplifier, such as a conventional travelling wave tube, in order to provide the required sensitivity to weak signals.

Since many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A radio frequency spectrum analyzer including a two-conductor transmission line structure and means for applying input high frequency signals to said line to produce travelling waves thereon, said line structure having longitudinally periodic variations in spacing between said conductors to provide alternate regions where relatively strong electric fields and relatively weak electric fields respectively are produced by such travelling waves, said structure being relatively wide with respect to the spacing between said conductors, the longitudinal spacing of said periodic variations varying laterally of said structure from a maximum value at one side to a minimum value at the other side; means for producing a ribbon shaped beam of electrons and directing said beam along said structure in the space between said conductors, said beam being of about the same width as said structure, and means disposed in the path of said beam beyond the end of said line structure remote from said beam-producing means for indicating deflection of electrons in said beam from the paths they normally follow in the absence of waves on said line structure.

2. The invention set forth in claim 1, wherein said periodic variations in spacing between said conductors are provided by longitudinally spaced transverse slots in one of said conductors, on its surface facing the other of said conductors.

3. The invention set forth in claim 2, wherein the depth of said slots is less than $$\frac{c}{4f}$$

where $c$ is the velocity of propagation of electromagnetic waves in free space and $f$ is the highest frequency to be indicated by the device.

4. The invention set forth in claim 2, wherein the maximum longitudinal spacing of said slots is less than about one-tenth the free space wavelength of waves of the lowest frequency to be indicated by the device.

5. The invention set forth in claim 2, wherein $$\frac{cs}{6h} > u$$

where $c$ is the velocity of propagation of electromagnetic waves in free space, $s$ is the minimum separation of said slots longitudinally of said line structure, $h$ is the depth of said slots, and $u$ is the average velocity of said electron beam longitudinally of said structure.

References Cited in the file of this patent
UNITED STATES PATENTS

| | | |
|---|---|---|
| 2,367,764 | Ferris | Jan. 23, 1945 |
| 2,487,656 | Kilgore | Nov. 8, 1949 |
| 2,530,580 | Lindenblad | Nov. 21, 1950 |